(12) United States Patent
Sabol et al.

(10) Patent No.: US 7,310,944 B2
(45) Date of Patent: Dec. 25, 2007

(54) WAVE ENERGY CONVERTERS (WECS) WITH VELOCITY MULTIPLICATION

(75) Inventors: Thomas Sabol, Lawrenceville, NJ (US); David B. Stewart, Cranbury, NJ (US)

(73) Assignee: Ocean Power Technologies, Inc., Pennington, NJ (US)

( * ) Notice: Subject to any disclaimer, the term of this patent is extended or adjusted under 35 U.S.C. 154(b) by 319 days.

(21) Appl. No.: 11/080,718

(22) Filed: Mar. 15, 2005

(65) Prior Publication Data
US 2005/0235641 A1 Oct. 27, 2005

Related U.S. Application Data

(60) Provisional application No. 60/553,666, filed on Mar. 16, 2004.

(51) Int. Cl.
*F03C 1/00* (2006.01)
(52) U.S. Cl. .......................... 60/495; 60/496
(58) Field of Classification Search ........... 60/495, 60/496
See application file for complete search history.

(56) References Cited

U.S. PATENT DOCUMENTS

| | | | |
|---|---|---|---|
| 1,223,184 A * | 4/1917 | Larson | 417/332 |
| 3,970,415 A * | 7/1976 | Widecrantz et al. | 417/332 |
| 4,363,213 A * | 12/1982 | Paleologos | 60/505 |
| 5,710,464 A * | 1/1998 | Kao et al. | 290/53 |
| 6,328,539 B1 * | 12/2001 | Hung | 417/330 |
| 6,644,027 B1 * | 11/2003 | Kelly | 60/498 |
| 6,857,266 B2 * | 2/2005 | Dick | 60/496 |

\* cited by examiner

*Primary Examiner*—Hoang Nguyen
(74) *Attorney, Agent, or Firm*—Henry I Schanzer

(57) ABSTRACT

A WEC system embodying the invention includes a column and shell, arranged to move relative to each other, and a lever-like apparatus having an input end and an output end and an intermediate point, between the two ends, the intermediate point being rotatably connected to the column. The input end is connected to the shell and moves at the same velocity and in the same direction as the shell. The output end moves in the opposite direction and at a rate which is a multiple of the shell velocity. The multiple being a function of the ratio of the length of the intermediate point to the output and input ends. In systems embodying the invention, one of two components (a PMA or an ICA) of a linear electric generator may be attached to the shell and the other of the two components may be attached to the output end of the lever-like apparatus to produce high relative velocity between the two components resulting in higher amplitude and higher frequency output voltages.

9 Claims, 16 Drawing Sheets

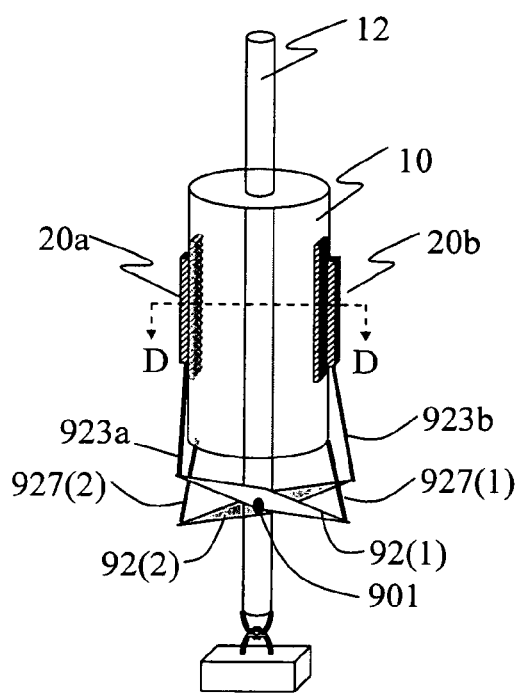
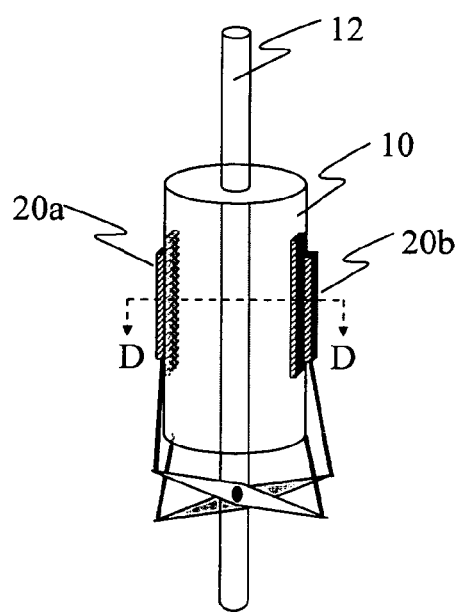
FIGURE 1D
Anchored WEC w/LEG
FIGURE 1E
Dual Absorber WEC w/LEG

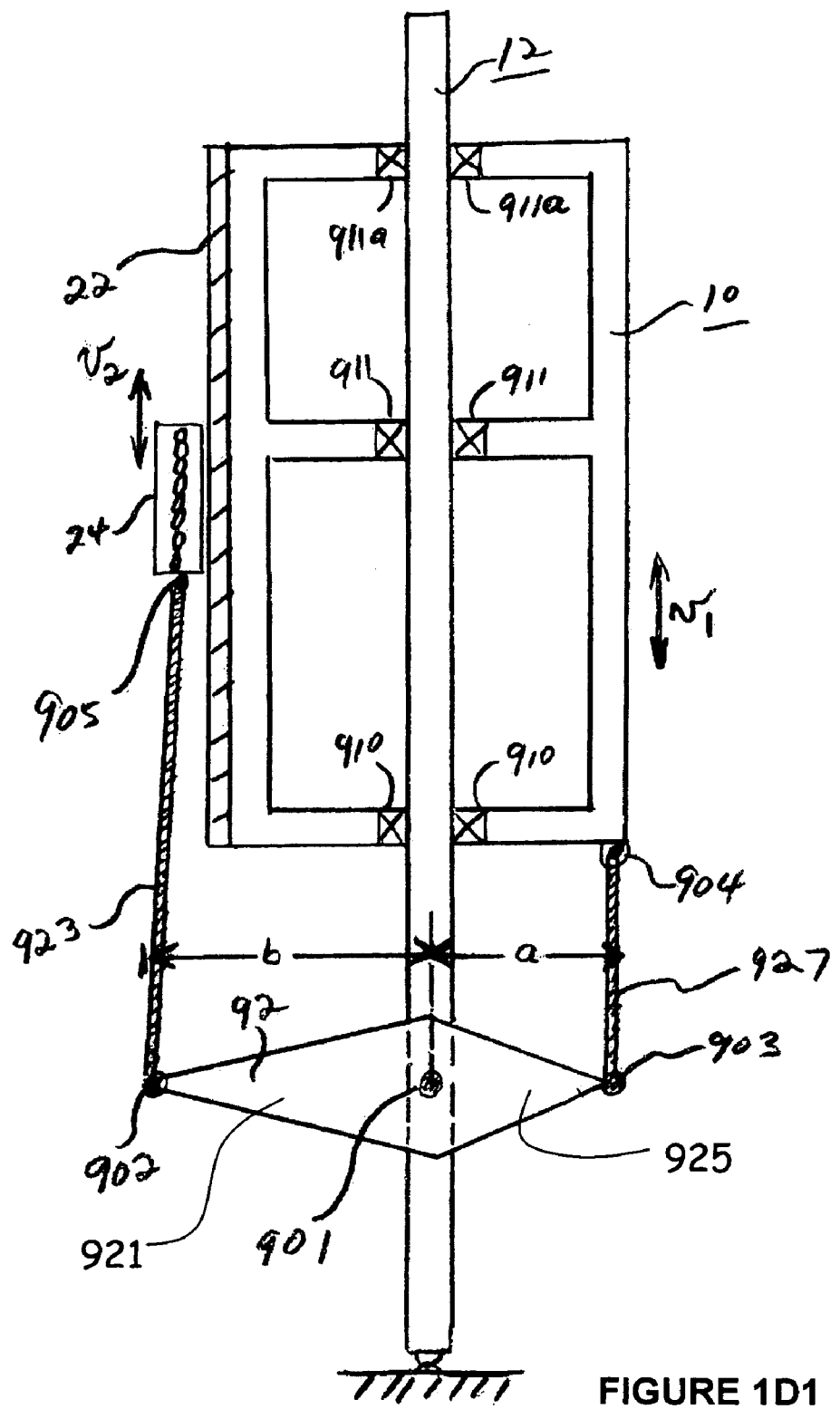
FIGURE 1D1

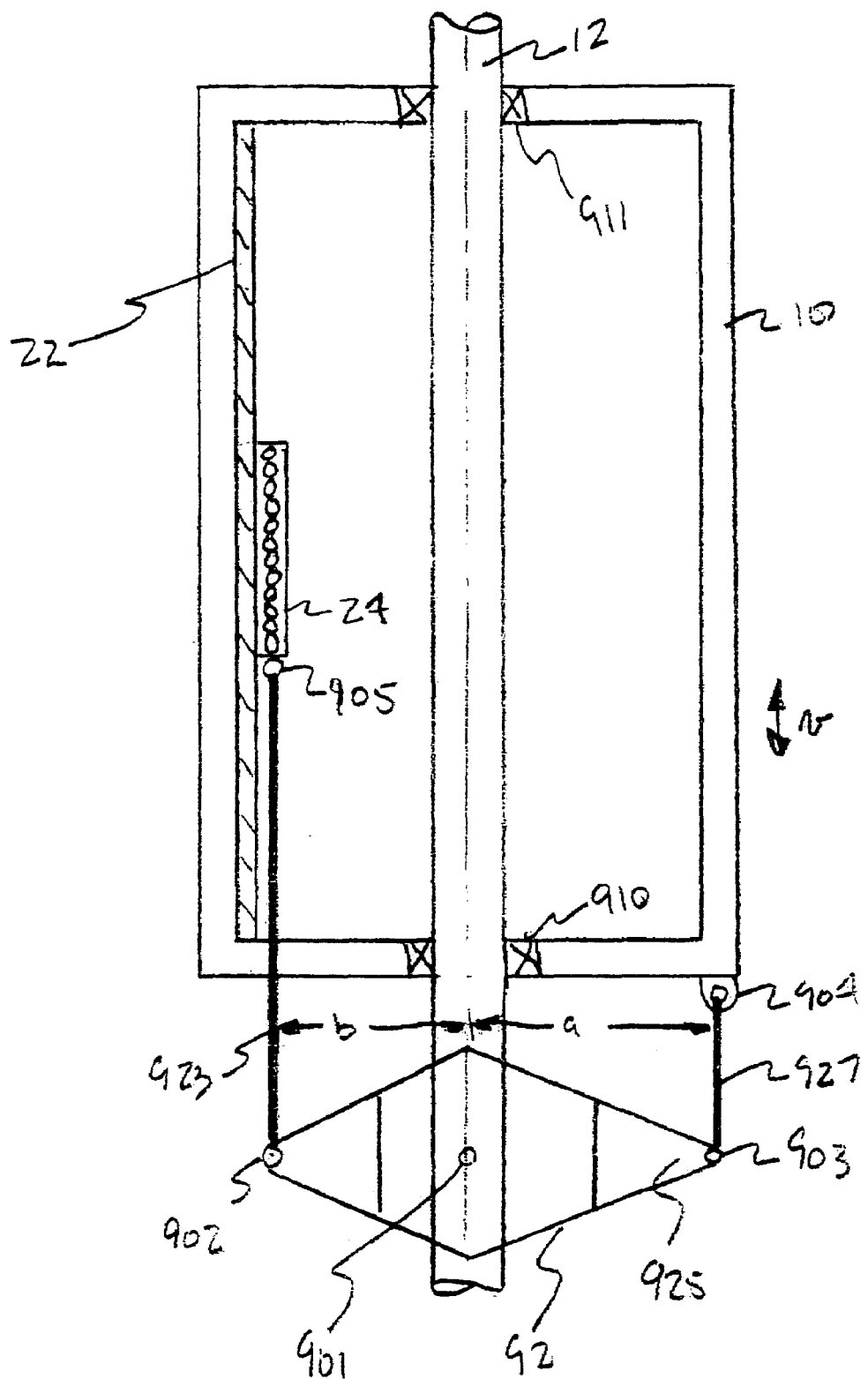
FIGURE 1D2

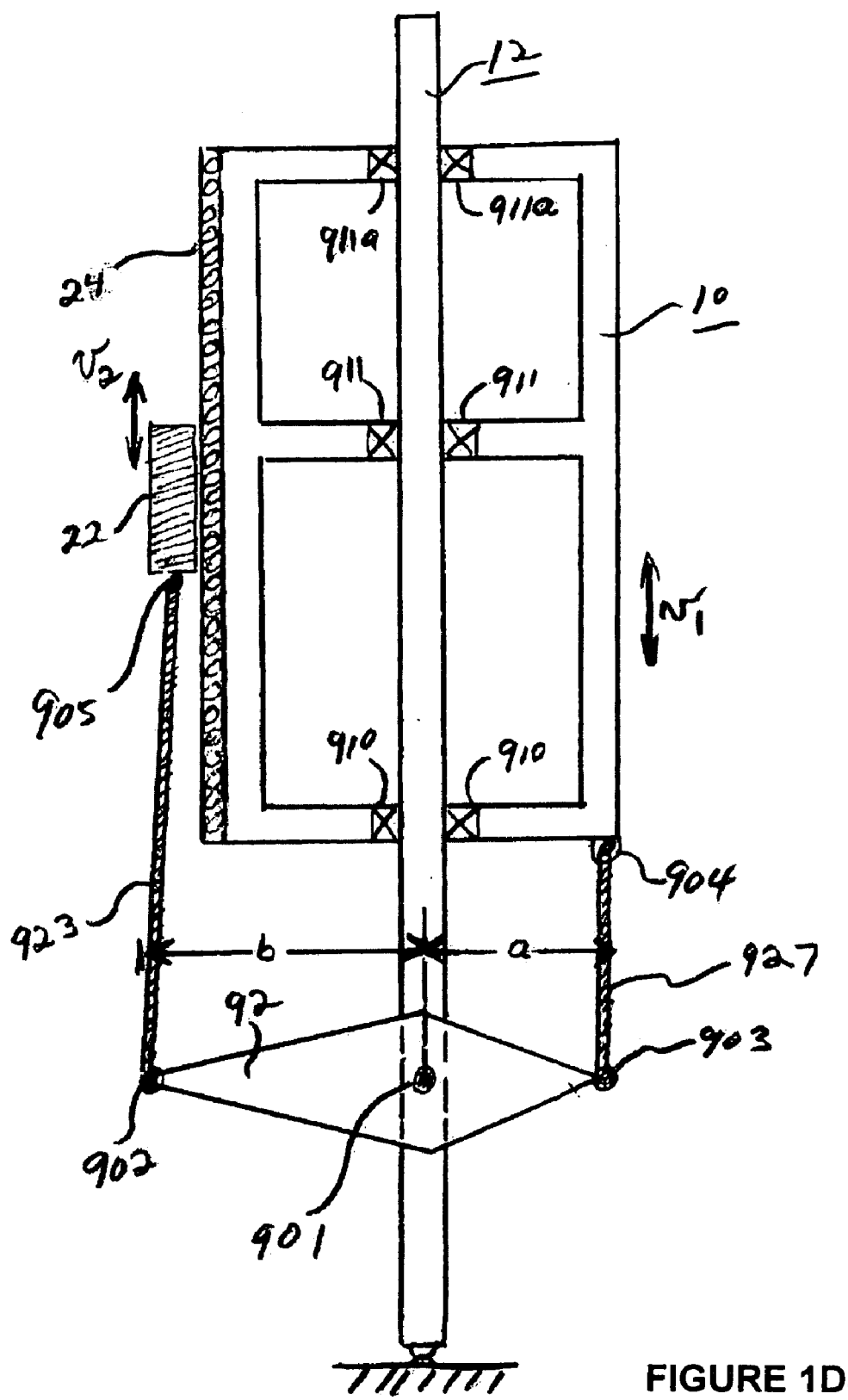
FIGURE 1D3

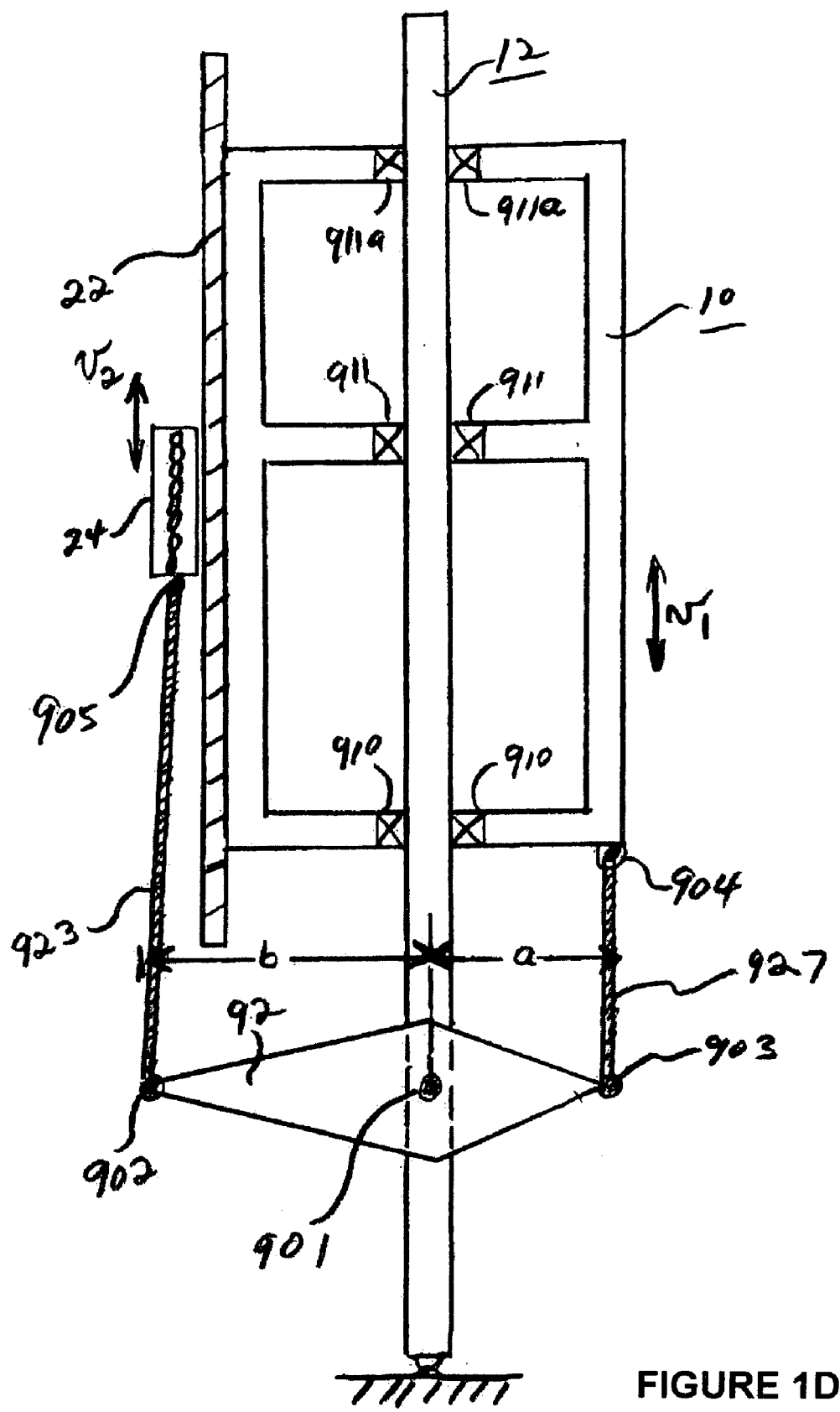
FIGURE 1D4

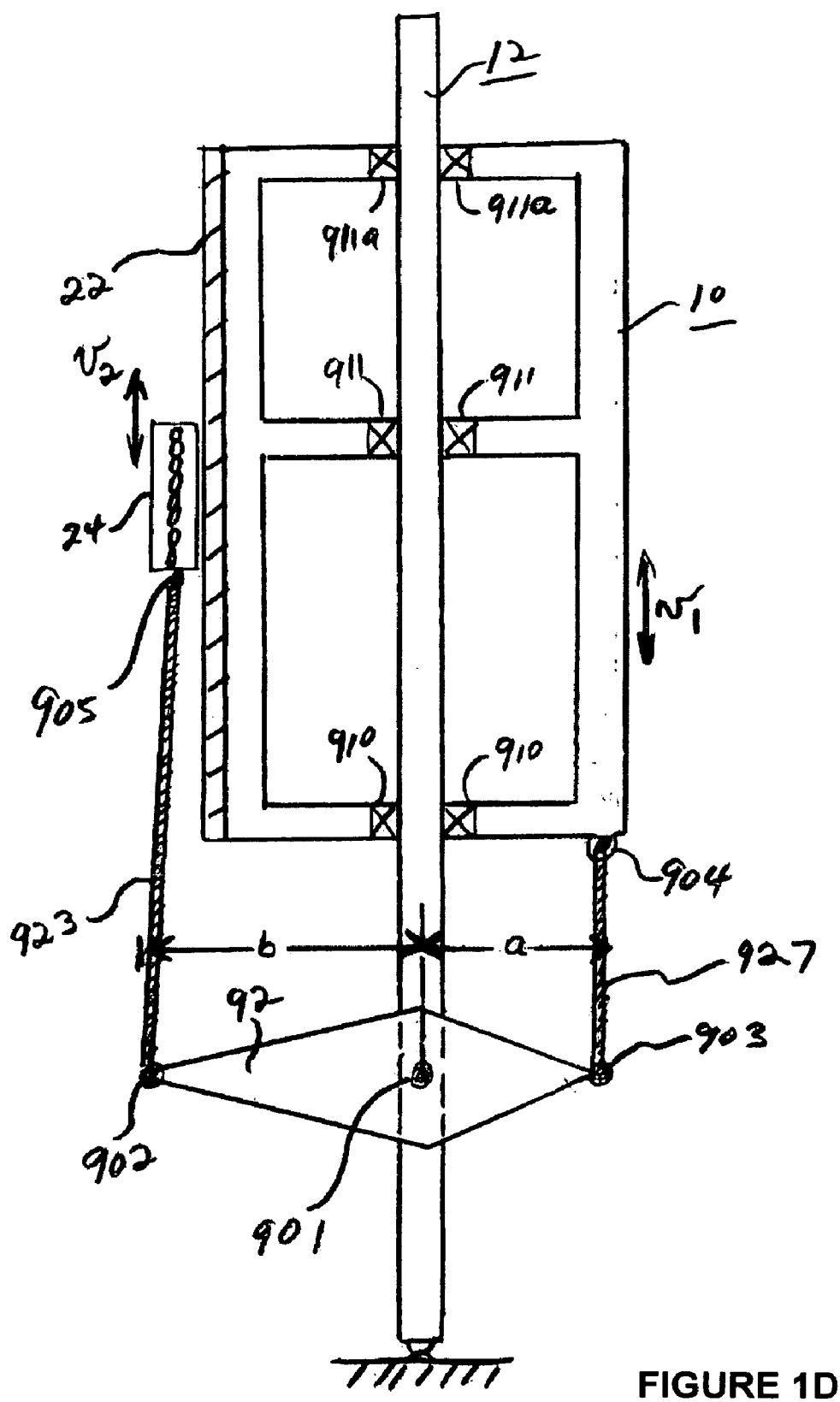
FIGURE 1D5

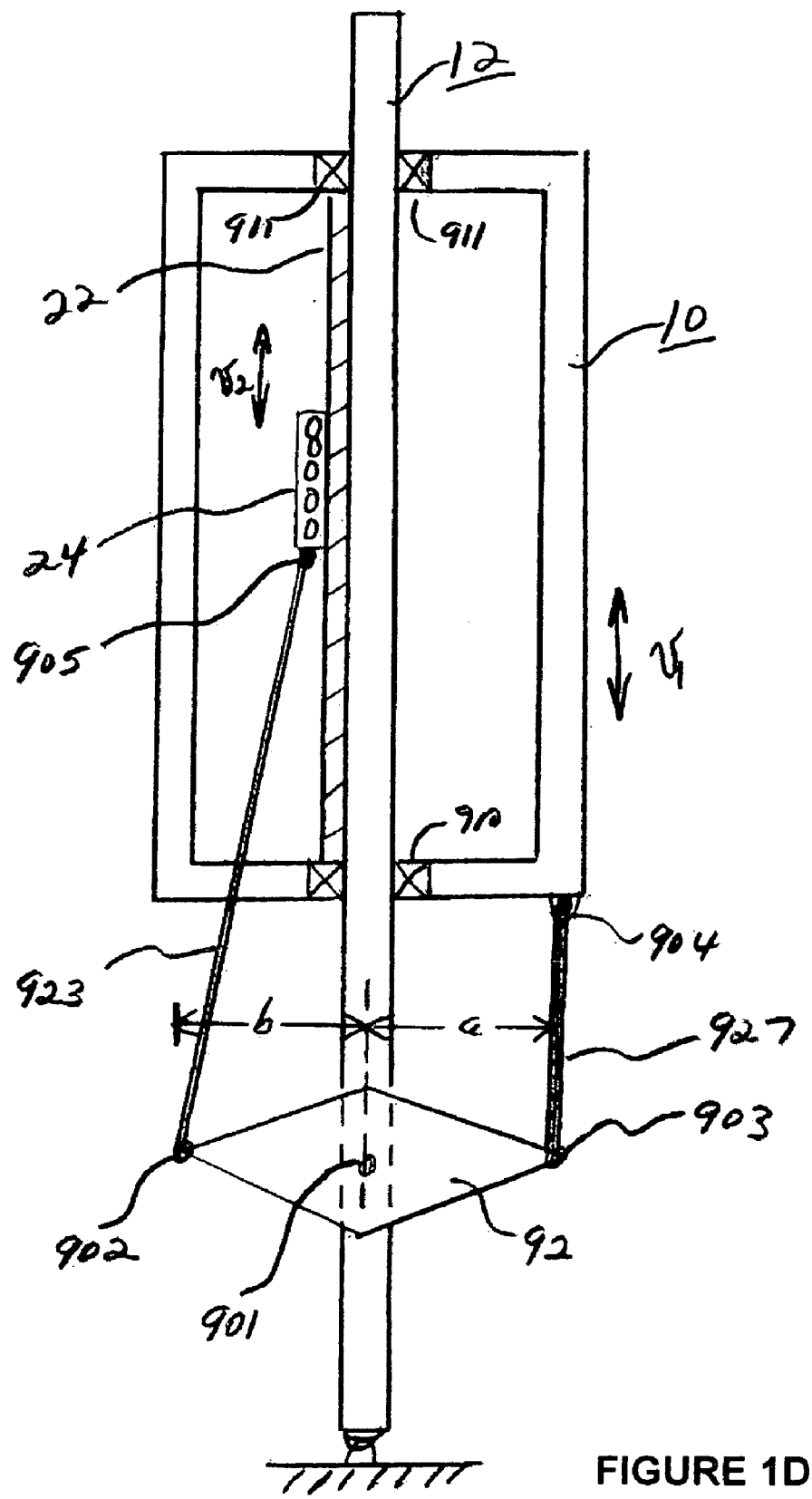
FIGURE 1D6

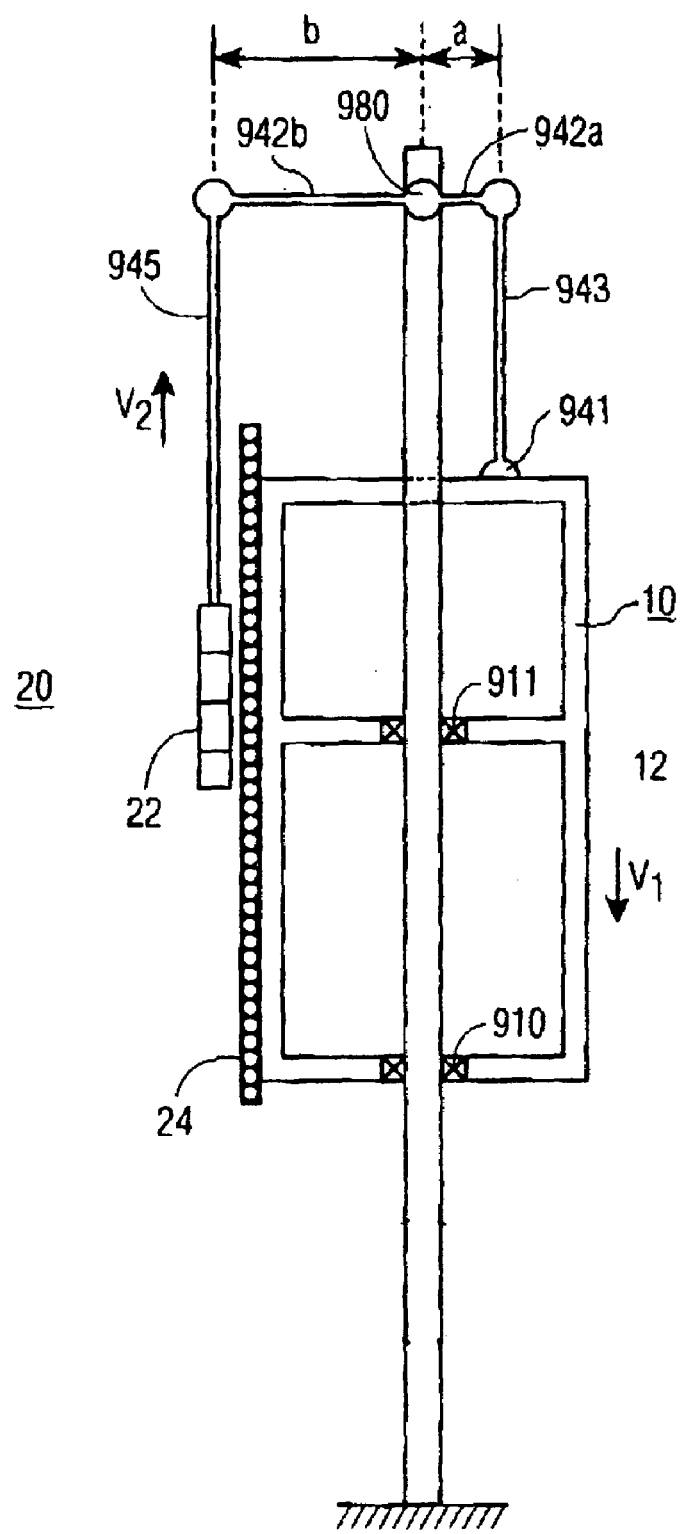
FIGURE 1D7

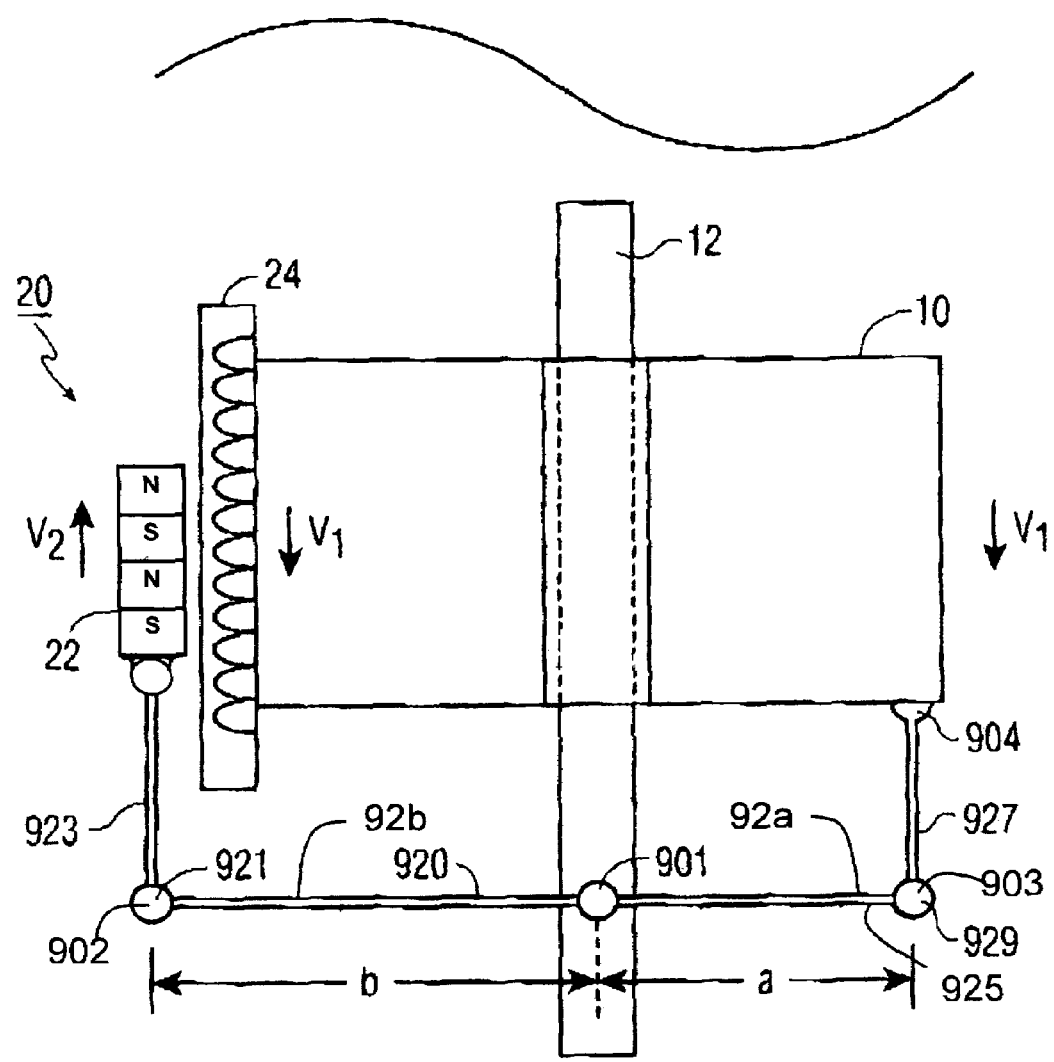
FIGURE 1D8

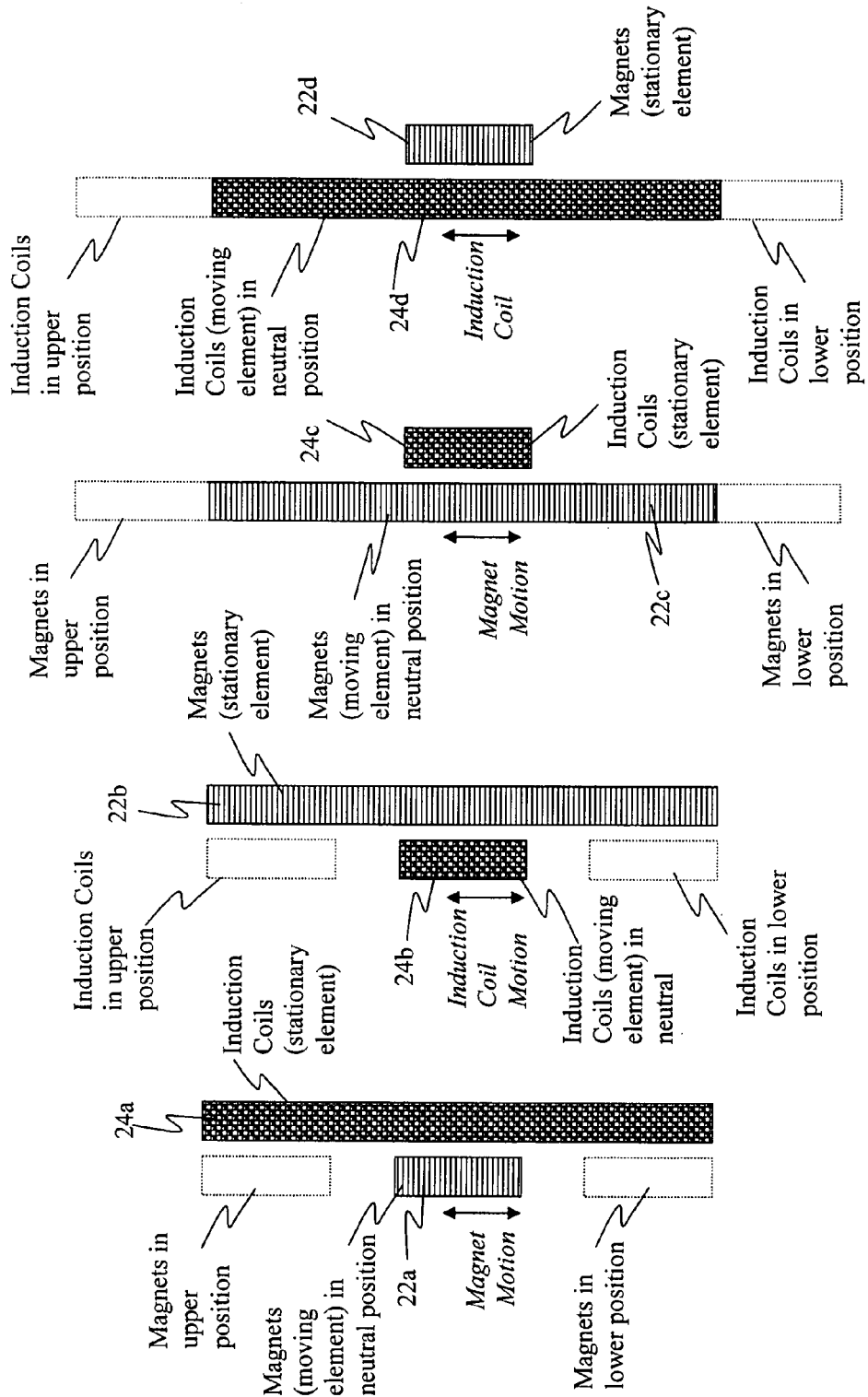

LEG Surface Permanent Magnet Configuration

LEG Buried Permanent Magnet Configuration

Sample plot showing LEG output voltage and WEC shell-column differential speed versus time. Voltage is proportional to speed, magnet flux and coil configuration. Frequency is proportional to speed and pole pitch.

Sample plot showing LEG output power and WEC shell-column differential speed versus time. Instantaneous power is proportional to product of force and speed ($P_{LEG} = F \bullet V_S$)

WAVE ENERGY CONVERTERS (WECS) WITH VELOCITY MULTIPLICATION

CROSS REFERENCES TO RELATED APPLICATIONS

This application claims priority from provisional patent application Ser. No. 60/553,666 titled Wave Energy Converters (WECs) with Linear Electric Generators (LEGs) filed Mar. 16, 2004, the teachings of which are incorporated herein by reference.

BACKGROUND OF THE INVENTION

This invention relates to apparatus, systems and methods for converting energy present in ocean surface waves into electric energy.

A known wave energy converter (WEC) system for capturing ocean wave energy and converting it to electrical energy includes: (a) a first structure (which may be referred to as a "shell" or "vessel" or "float") which, when placed in a body of water, is designed to move up and down, generally, in phase with the waves in the water and thus absorb and/or release energy; (b) a second structure (which may be referred to as a "shaft", "spar", "column" or piston) which is either stationary (e.g., tethered) or moves generally out of phase relative to the waves and the first structure; and (c) a power take off (PTO) device coupled between the first and second structures and which in response to the relative motion between the first and second structures is designed to produce electrical energy.

To avoid problems associated with mechanical and hydraulic PTOs, it has been suggested to use a linear electric generator (LEG) for a power take-off (PTO) device. However, a significant problem with extracting power efficiently from a wave energy converter (WEC) is the fact that wave motion is of relatively slow speed and, consequently, the relative movement between the column and shell is correspondingly slow. Thus, by way of example, where a linear electric generator (LEG) is used as the PTO, there is generated alternating current (AC) voltages which tend to be of low amplitude and low frequency. Processing and or rectifying low amplitude AC voltages tends to be inefficient because of the fixed losses in the rectifying networks; i.e., approximately 1 volt to 1.5 volts are normally lost across the rectifying networks. Processing low frequency signals is generally inefficient in that it requires the use of physically large inductors, transformers and capacitors. This also tends to increase the costs of the system and to decrease its efficiency.

It is therefore desirable to have apparatus which can produce AC voltages of higher amplitude and higher frequency

SUMMARY OF THE INVENTION

Applicant's invention includes apparatus responsive to the input speed (v1) of the shell relative to the column of a WEC for producing a mechanical output whose velocity (v2) is a multiple of the input speed (v1). The velocity (v2) of the mechanical output is used to drive components of the WEC to produce electrical voltages of greater amplitude and higher frequency.

A WEC system embodying the invention includes a shell and a column with a linear electric generator (LEG) power take-off (PTO) device connected between the shell and the column. The shell and column are constructed such that, when placed in a body of water and in response to waves in the body of water, there is relative motion between the shell and the column. The LEG includes components which are attached to the shell and column so as to move relative to each other and produce electrical energy, directly, when the shell and column move relative to each other. The electricity producing components of the LEG include a permanent magnet assembly (PMA) and an induction coil assembly (ICA) which are electromagnetically coupled to each other whereby, when the PMA passes over the ICA, alternating current (AC) voltages are produced in, and across, the ICA. The amplitude of the AC voltages (and the frequency of the voltages) is a function of the velocity of the PMA relative to the ICA. Systems embodying the invention include mechanical means for increasing the velocity at which the PMA is driven relative to the ICA for producing higher amplitude and higher frequency voltages.

A WEC system embodying the invention includes a column and shell, arranged to move relative to each other, and a lever-like apparatus having an input end and an output end and an intermediate point, between the two ends, the intermediate point being rotatably connected to the column. The input end is connected to the shell and moves at the same velocity and in the same direction as the shell. The output end moves in the opposite direction and at a rate which is a multiple of the shell velocity. The multiple being a function of the ratio of the length of the intermediate point to the output and input ends.

In systems embodying the invention, one of two components (a PMA or an ICA) of a LEG may be attached to the shell and the other of the two components may be attached to the output end of the lever-like apparatus to produce high relative velocity between the two components resulting in higher amplitude and higher frequency output voltages.

A WEC system embodying the invention may include lever-like apparatus, coupled between the shell and the column, (below, above or within, the shell), having an input which is responsive to the speed (v1) of the shell relative to the column (or of the column relative to the shell) and having an output whose speed (v2) is a multiple of the speed (v1) of the shell relative to the column. One of the ICA and PMA is attached to one of the shell and column of the WEC. The other one of the ICA and PMA is coupled to the output of the lever-like apparatus which drives the other one of the ICA and PMA across the one of the ICA and PMA attached to one of the shell and column of the WEC.

The lever-like apparatus may include a rigid member which is rotatably connected at a pivot point (i.e., the fulcrum), lying along its length, to the column. The apparatus includes: (a) an input arm extending a distance "a" from the pivot point to a first (input) end; and (b) an output arm extending a distance "b" from the pivot point to a second (output) end. The ratio of the length of the output arm to the input arm may be selectively set and varied to control the multiplication ratio of v2 to v1.

In one embodiment, one of the PMA and ICA is located on, or in, or attached to, the shell and moves as the shell moves in one direction at a first speed. The other one of the PMA and ICA is driven by the output of the lever-like apparatus across the one of the PMA and ICA attached to the shell, in the opposite direction, to the one direction, whereby the PMA and ICA assemblies can be driven past each other, in response to the motion of the waves, at a higher relative speed which is equal to the sum of the output speed (v2) and the input speed (v1) of the shell. This results in the generation of voltages across the ICA which are of larger amplitude and higher frequency.

In some embodiments, the PMA may be attached to the outside wall of the shell; and the ICA is mounted to slide, or pass, externally to the PMA (see FIG. 1D1); or the ICA is mounted to slide or pass internally (along the inside wall of the shell) to the PMA. In other embodiments, the PMA may be attached to the inside wall of the shell; and the ICA is mounted to slide, or pass, externally to the PMA; or the ICA is mounted to slide, or pass, internally (along the inside wall of the shell) to the PMA (see FIG. 1D2). In still other embodiments, the ICA may be attached to the outside wall of the shell; and the PMA is mounted to slide or pass externally to the ICA (see FIG. 1D3); or the PMA is mounted to slide, or pass, internally (along the inside wall of the shell) to the ICA. Alternatively, the ICA may be attached to the inside wall of the shell; and the PMA is mounted to slide, or pass, externally to the ICA; or the PMA is mounted to slide, or pass, internally (along the inside wall of the shell) to the ICA.

In still other embodiments, a PMA may be attached to the central column and the ICA may slide along the PMA (see FIG. 1D6). Alternatively, an ICA may be attached to the column and the PMA may pass along the ICA.

BRIEF DESCRIPTION OF THE DRAWINGS

In the accompanying drawings like reference characters denote like components.

FIG. 1D is a diagram (not to scale) showing the installation of a PMA and an ICA of a LEG on the outside of the shell of a WEC with means for providing velocity multiplication, in accordance with the invention;

FIG. 1E is an illustrative diagram (not to scale) of a WEC in which the shell (float) moves generally in phase with the waves and the column is untethered and can move generally out of phase with the motion of the waves with a LEG assembly connected on the outside of the shell of the WEC with means for providing velocity multiplication, in accordance with the invention;

FIG. 1D1 is a more detailed diagram (not to scale) of a velocity multiplication system embodying the invention;

FIG. 1D2 is a diagram (not to scale) of a velocity multiplication system with the LEG positioned on the inside wall of the WEC shell;

FIG. 1D3 is another diagram (not to scale) of a velocity multiplication system with the coils of a LEG installed along the outside wall of the WEC shell and the PMA passing along the outside of the coils;

FIGS. 1D4, 1D5 and 1D6 illustrate different configurations of LEGs positioned in WECs with velocity multiplication in accordance with the invention;

FIG. 1D7 is a diagram of (not to scale) of a velocity multiplication system in which the levering apparatus is positioned above the shell;

FIG. 1D8 is a simplified diagram illustrating the principles of velocity multiplication of the invention;

FIG. 2 is a cross-section diagram illustrating that the central column of the WEC may be multi-sided (e.g., a square column), with the inner wall of the shell having a face parallel to each side of the central column and with LEG assemblies located along the outer walls of the shell;

FIGS. 3A, 3B, 3C and 3D depict, illustratively, different configurations of magnetic arrays and induction coil assemblies suitable for use in practicing the invention;

DETAILED DESCRIPTION OF THE INVENTION

Figures 1A, 1B, 1C:
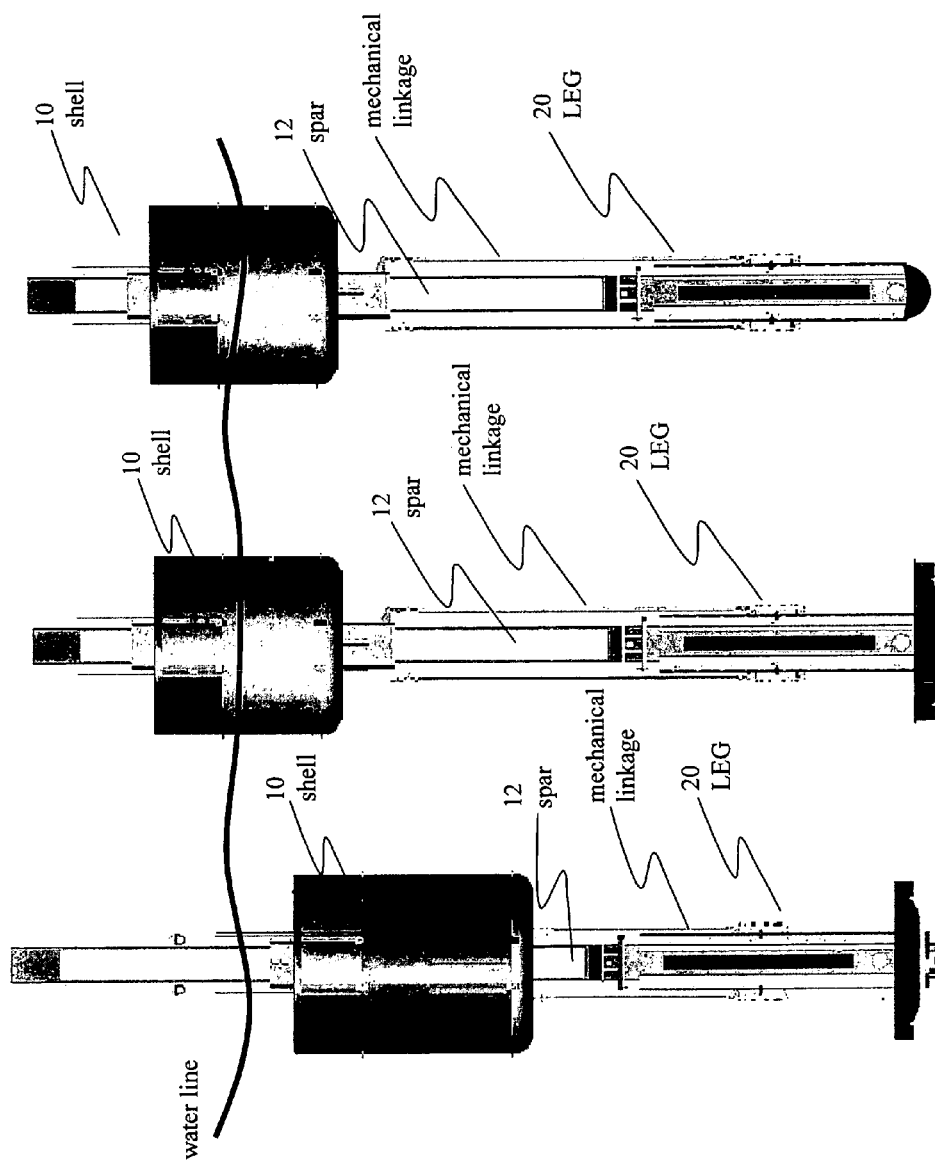
FIGS. 1A, 1B and 1C depict various WECs for use in practicing the invention.

Wave energy converters (WECs) suitable for practicing the invention may include systems of the type shown in FIGS. 1A, 1B, and 1C. FIG. 1A shows a neutrally buoyant shell 10 typically submerged below the surface of the ocean with a tethered or anchored vertical column (spar) 12. FIG. 1B shows a buoyant shell typically floating at the surface of the ocean also with a tethered or anchored vertical column (spar)12. FIG. 1C illustrates a dual wave energy absorber where the shell 10 and the spar 12 move relative to each other, the shell generally in phase with the waves and the spar tending to move out of phase with the shell and/or the ocean waves. The WECs may include one, or more, power take off (PTO) devices which include a linear electric generator (LEG) device 20 connected between the "shell" and the "spar".

In general, any WEC which includes first and second structures (e.g., a shell and a column) which, in response to forces such as those produced by ocean waves, move relative to each other may be suitable for practicing the invention. In accordance with the invention, a PTO, which includes a linear electric generator (LEG) 20, may be coupled between the first and second structures to convert their relative motion into electrical energy, directly. Furthermore, in accordance with the invention, the PTO may be placed in many different locations, providing a high degree of freedom in the design of the physical configuration of the system.

Linear Electric Generator (LEG)

In several embodiments of the invention, a linear electric generator (LEG) is proposed as the WEC's power take-off (PTO) device for a number of reasons. The projected efficiency of the all-electric system is estimated to be above 90% at rated force and velocity. This efficiency is well above the less than 80% efficiency of the existing hydraulic-electric system. The hydraulic components are also expensive, have limited life and reliability, and present installation and maintenance challenges. The elimination of the hydraulic components is an important reason for using LEGs.

A significant benefit of the LEG is that it enables implementation of significant improvement in efficiency and survivability features. One aspect of the invention is that it enables implementing an active impedance matching system (AIMS) which includes feeding back power to the buoy (WEC) during a portion of each wave cycle. It has been found that using an hydraulic system for feed back is difficult to achieve on a long-term basis. The life of a hydraulic motor, when operated as a pump, is shortened significantly. The LEG, on the other hand, can be operated as a motor and/or as a generator, depending on the direction of current flow and applied mechanical force. Thus, the LEG enables active impedance matching, with a resultant increase in WEC efficiency.

A LEG can also be configured with essentially unlimited stroke. This feature has enormous benefit in terms of WEC structural design and survivability. In existing WEC designs, the impact forces, not the wave forces, control the structural design. Also existing WECs have limited stroke, driven by the finite length of the hydraulic cylinder or other mechanical PTO devices, which requires a mechanical system with end stops and dampers to absorb the impact loads. The anchor, universal joint, and column must also be designed to handle these loads. In a system embodying the invention, without these end stops, the force on the structural components is limited to that exerted by the power take-off device (the LEG in this case). With the addition of copper or aluminum plates at the end of normal power take-off stroke, passive damping (braking) can be implemented. This damping serves to take energy out of the buoy in storm conditions. Thus, the structural design of a WEC using LEG systems is greatly simplified.

The WECs shown in FIGS. 1A, 1B an 1C, incorporating LEG assemblies as shown in FIGS. 1D and 1E, are intended to be placed in a body of water (e. g., an ocean) and the waves cause the shell 10 to move up and down relative to the central column (piston or spar) 12. That is, the up and down motion of ocean waves applies a force to the shell 10, causing up and down motion of the shell relative to the column 12 which may be a stationary member of the wave energy converter system. Alternatively, the column 12 may also be a moving member, but whose movement tends to be out of phase with the motion of the shell. In FIGS. 1A, 1B and 1D, the spar 12 is shown anchored and to be stationary with the shell 10 moving up and down. In FIGS. 1C and 1E, directed to a dual absorber configuration, the shell 10 and the spar 12 may both move relative to each other, with the shell tending to move, generally, in a direction opposite to the spar.

Different WECs may utilize different LEG configurations. However, each LEG 20 normally includes a permanent magnet assembly (PMA), 22, and an induction coil assembly (ICA), 24. In accordance with the invention, the PMA 22 and the ICA 24 need not be encased in a common sealed housing. Separately enclosed magnet and induction coil assemblies provide options not possible with known common-housing linear electric machines. The LEG assemblies can be placed above, below, on the inside or on the outside of a WEC shell.

FIGS. 1D and 1E show that different LEG (e.g., 20a, 20b) assemblies may be placed on the outside of the WEC shell. In FIG. 1D, one part of the LEG (e.g., one of the PMA and ICA) is mounted along the external wall of the shell 10 and the other part of the LEG (e.g., the other one of the PMA and ICA) is mounted so as to pass by, and opposite, the first part of the LEG. Several link (radius) arms 92(i) are rotatably coupled to column 12 via a pivot point (which functions as a fulcrum) 901. Each link arm 92i is a bar or like rigid body (or may be any quadrilateral-type plate) which functions as a lever, with the pivot point 901 being the fulcrum about which the lever 92i rotates. One (input) end of each link arm 92i is shown connected to one end (904) of the shell 10 by means of a rigid rod 927i and its other, or output, end is shown connect via a rod 923i to a PMA or ICA assembly. When the shell moves, up or down, (see FIG. 1D1) the one (input) end 925, 903 of the lever 92 moves in tandem, i.e., in phase, with the shell and at the same velocity (v1). The other, or output, end 921, 902 of lever 92 moves in a direction opposite to the shell (and to the input end 925) and the input end 925 of the lever at a velocity v2.

The operation of the lever may be better explained with reference to FIG. 1D8 which is a highly simplified cross-sectional diagram illustrating the invention. The lever 92 which is a rigid bar is rotatably mounted on shaft 12 via a pivot pin 901, which, as already noted, functions as a fulcrum, about which the bar 92 can swing, up or down, or rotate. The input end 925 of lever 92 is connected (and linked) via a rod 927 to one end 904 of shell 10. The output end, 921, of the lever is connected (linked) to one end of a rod 923 whose other end is connected to a PMA 22. An ICA 24 is attached to the outside wall of the shell 10. Assume, for example, that the shell 10 moves down at a speed v1 as a result of an ocean wave. When that occurs, the shell 10 causes the input end 925 of lever 92 to be pushed down at a speed of v1. If the length "a" of arm 92 is equal to the length "b", then the output end 921 of lever 92 will move at the same rate as the input end; but, in the opposite direction (i.e., 180 degrees out of phase). The output end 921 drives the rod 923 and the PMA 22. For 92a=92b, the PMA will pass across the ICA with a velocity equal to v1, in an upward direction while ICA 24 (attached to the shell) is moving with a velocity equal to v1, in a downward direction (and vice versa). Consequently, the relative velocity of the PMA across the ICA is equal to 2 v1. Thus, by use of the lever-like mechanism, the effective velocity between the PMA and the ICA has been doubled.

By varying the ratio of the arms of the lever (i.e., the length of 92a to the length of 92b) the relative velocity of the PMA to the ICA can be further increased or decreased. The lever may be described as a rigid body having two ends, with an intermediate point between the two ends, connected to the column.

In FIG. 1D8 the ICA is shown connected to the shell and the output end of the lever is shown connected to the PMA. But, it should be understood that the PMA could be connected to the shell and the ICA could be driven from the output end 921 of the lever via rod 923.

A desirable feature of this design is that the relative stator-magnet velocity may be increased substantially for producing greater electric output. As a result, the LEG force requirement and size can be decreased (e.g., halved). A disadvantage of this approach is the limited stroke that can be achieved.

The amplitude and frequency of the voltage obtained from a LEG is a function of the velocity with which the magnets and the coils interact (i.e., the speed at which one passes over, or by, the other). Generally, doubling the velocity of the coils (or magnets) passing the magnets (or coils) of the LEG results in a doubling the amplitude of the voltage produced within or across the ICA. This results from the fact that the coil voltage (e) produced is equal to N d$\phi$/dt; where N is a flux coupling factor and $\phi$ is the magnetic flux between the PMA and the ICA. If a given change in d$\phi$ occurs in ½ the time, then the amplitude of the output voltage is doubled. Consequently, it is highly desirable to increase the velocity of the coils passing along the magnets. Especially when the voltages have to be rectified and the rectifier networks cause fixed losses.

In FIG. 1D1 (and 1D8), the shaft 12 is tethered and the shell 10 is positioned about the shaft and remains so positioned; but it can move up and down relative to the central shaft 12 by means of shaft bearings 910, 911 which enable the shell to slide up and down. In FIG. 1D1, the LEG assembly 20 includes: (a) a PMA 22 which is located on, or along, the outside wall of the shell and which runs along the length of the shell 10; and (b) an ICA 24 also located on the outside of the shell, exterior to the PMA. A radius arm 92 is rotatably connected to column 12 at a pivot point (fulcrum) 901, whereby the two opposite ends of radius arm 92 can swing up and down, like as see-saw. The input end, 925, of radius arm 92 is linked to the shell 10 and moves up and down with the shell. The output end, 921, of the radius arm 92 is coupled to the ICA (or the PMA) and causes the ICA (or the PMA) to move in a direction opposite to the direction in which the shell is moving. Velocity multiplication is obtained by varying the ratio of the length (92a, 92b) of the arms extending from the pivot point to the ends of the radius arms. In FIG. 1D1 the length of the radius arm extending from the pivot point to the input end 925, coupled to the shell 10, is defined as "a" and the length of the radius arm extending from the pivot point to the output end, 921, is defined as "b". (For ease of discussion, point 921 and pivot 902 are assumed to be the same point). Output end 921, 902 of lever arm 92 is coupled via a connecting arm (rod) 923 to a link 905 which is connect to one end of coil assembly 24. In FIG. 1D1, the input end 925 of pivot arm 92 is connected to a pivot point 903 which is coupled via a link arm 927 to a link point 904 which is connected to the bottom right hand side of the shell 10.

A pressure differential between the top and bottom surfaces of the WEC 10 (i.e., shell 10) causes the shell 10 to move downward with velocity v1, as shown on FIG. 1D1. The shell 10 travels in a path, generally parallel to the shaft 12, with the shaft 12 passing through the bearings 910, 911. The shell 10 is connected to the radius arm 92 by means of link arm 927. When the shell 10 moves down it causes the input end point 903 to be pushed down and output points 921 and 902 to be driven upward. Assume that the length of the link arm from input point 903 to the central pivot point 901 is "a" and that the length of the link arm from central pivot point 901 to output point 902 is "b". By changing the dimensions of "a" and/or "b", the lever arm 92, rotatably connected to the shaft at pivot point 901, can be used to produce different multiplication ratios. That is, the portion 92a of radius arm 92 extends for a distance "a" between pivot point 901 and the input end 925 of the portion 92b of arm 92 and extends a distance "b" between pivot point 901 and the output end 921. The central portion of arm (or plate) 92 of FIG. 1D1 may be slotted to allow the lever arm or plate to be moved laterally in order to change the ratio of the length "a" to the length "b". Although a single plate or bar is shown in the figures, a twin plate or bar may be placed on the opposite side of the column with the two plates being joined to provide greater strength and balance.

The arm 92 may be moved laterally along the slot and secured such that the distances "a" and "b" may be varied. When "a" is equal to "b", the velocity v2 is equal to velocity v1 (but in the opposite direction); when "b" is greater than "a", the velocity v2 is greater than v1. In fact, when "b" is twice the value of "a", v2 is twice the value of v1. The relationship of v2 to v1 may be expressed as follows: v2 is approximately equal to (b/a) times v1.

The significance of the velocities v1 and v2 (and their direction) is that they determine the rate at which the PMA 22 and the ICA of LEG 20 pass by each other and the quality of the output voltages generated across the ICA. In FIG. 1D1, The PMA is shown attached along the length of the WEC shell 10. The ICA 24 is magnetically coupled (tightly) to the PMA 22 and is physically constrained to travel along the PMA. The ICA is driven by rod 923 which is in turn driven by the output of lever 92. ICA 24 moves upward when the shell 10 moves downward, and moves down when the shell 10 moves upwards. By adjusting the ratio of 92a to 92b, different relative velocities can be obtained between the PMA 22 (functioning as the rotor) and the ICA 24 (functioning as the stator) of the LEG.

The relative velocity (delta v) may be described as follows:

$$\text{Delta } v = v1 + v2 = v1(b+a)/a \qquad \text{eq. 1A}$$

Note: to correctly interpret equation 1A it must be recalled that v1 and v2 are going in opposite direction such that if a plus sign is assigned to one direction, the opposite direction is a minus.

Figure 2:
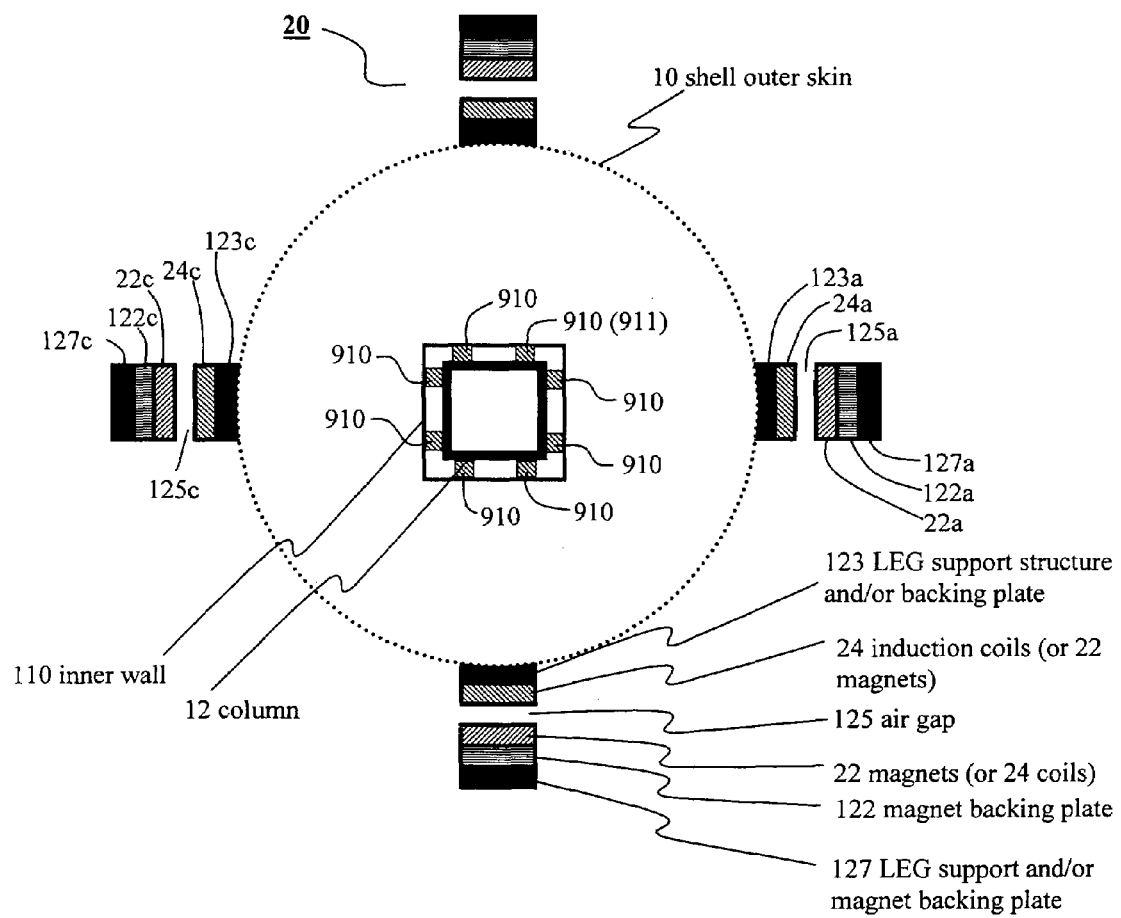

FIG. 1D2 illustrates that the LEG assembly may be located on the inside wall of the shell 10. The operation of this configuration is otherwise similar to that of FIG. 1D1.

FIG. 1D3 illustrates that the induction coil assembly 24 may be laid out along the length of the shell and a permanent magnet assembly 22 can be coupled to one end of a rod 923 so as to move back and forth across and along the coil assembly.

FIG. 1D4 illustrates that a section 150u is formed at or above the top of the shell 10 and a section 150d is formed at or below the bottom of the shell 10. Sections 150u and 150d may be part of the LEG assembly and provide additional travel for the coil or magnetic assembly. Alternatively, sections 150u and 150d may include means for braking or damping the travel of the magnetic assembly and preventing it from going beyond the top or bottom of the shell 10. Sections 150u and 150d may include, for example, shorted coils or a copper bar or any like apparatus which will provide a strong counter force to the movement of the magnetic assembly.

FIG. 1D5 illustrates that the LEG may be formed in a groove in the external wall of the shell.

FIG. 1D6 illustrates that the LEG assembly could also be located along the column within the shell.

FIG. 1D7 illustrates that the lever-like apparatus 942 may be located above the shell with the rigid lever 942 rotatably mounted on the column 12 via a pivot pin 980 which functions as the fulcrum of the lever 942. The shell is connected to the lever via a rod 943 extending from the end of arm 942a to connecting pin 941 located on shell 10 a distance "a" from the central column. The other end of arm 942b is connected via a rod 945 to a PMA 22 and driven over a coil assembly 24. The ratio of the length of arms 942a to arm 942b may be selected to determine the multiple of v2 as a function of v1. The operation of the structure is otherwise similar to that already described.

FIG. 2 shows a cross section of four LEG assemblies mounted externally to the shell 10 and which may be driven, as discussed above. The inner column 12 may be a square column and the inner wall(s) 110 of the shell 10 may also form a square column surrounding the column 12 for preventing rotation of the shell relative to the column. Each LEG assembly includes a LEG support 123, an ICA 24 mounted on support 123, an air gap 125, a PMA 22, a magnetic support plate 122 and a LEG support plate 127. The PMA 22 (or ICA 24) and its support may be connected (linked) to a connecting arm 923 to cause the assembly to move in a direction which is opposite to the motion of the shell as discussed above. In general, the location and mounting of the ICA 24 and the PMA 22 may be interchanged, as already discussed.

FIGS. 3A, 3B, 3C, and 3D are illustrative diagrams showing four possible permanent magnet and induction coil geometries. In FIG. 3A, the magnet assembly 22a is relatively short and designed to move relative to the induction coil assembly 24a which is designed to be relatively long (and to be stationary or move out of phase relative to the magnetic assembly). In FIG. 3B the induction coil assembly 24b is designed to be short and to be moving relative to the magnetic assembly 22b which is designed to be long (and to be stationary or move out of phase relative to the coil assembly). In FIG. 3C, the magnetic assembly 22c is designed to be long and to be moving relative to the corresponding induction coil assembly 24c which is designed to be short (and stationary or move out of phase relative to the magnetic assembly). In FIG. 3D, the induction coil assembly 24d is designed to be long and to be moving relative to the corresponding permanent magnet assembly 22d which is designed to be short (and stationary or move out of phase relative to the coil assembly). This shows four of the many possible variations in the geometries of the coil and magnet assemblies.

It should also be noted that the magnetic and coil assemblies may both be capable of moving at the same time (preferably at different speeds and/or in opposite directions).

As already discussed and shown, the positioning of the magnetic and coil assemblies can be interchanged. For example, the magnets may be mounted on the inner central column (spar or shaft) and the coils may be mounted on the outer member (on the inside or the outside of the shell). Alternatively, the coils may be mounted on the inner central column (spar or piston) and the magnets may be mounted on the outer member (shell or vessel).

Figure 4A:
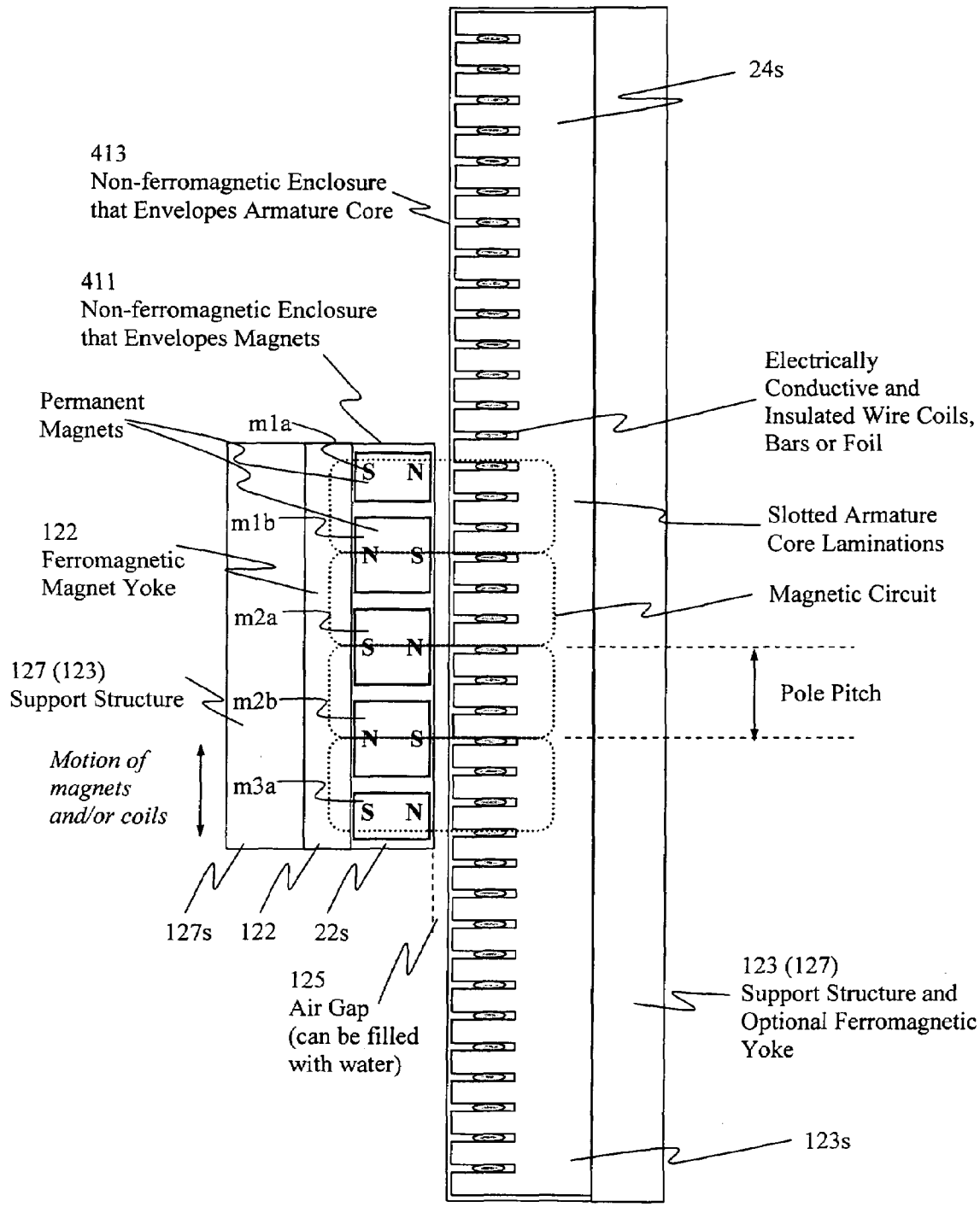
FIG. 4A is illustrative of a LEG with a "surface" permanent magnet assembly configuration using electrically conductive wire, coils, bars, or foil for practicing the invention.
Figure 4B:
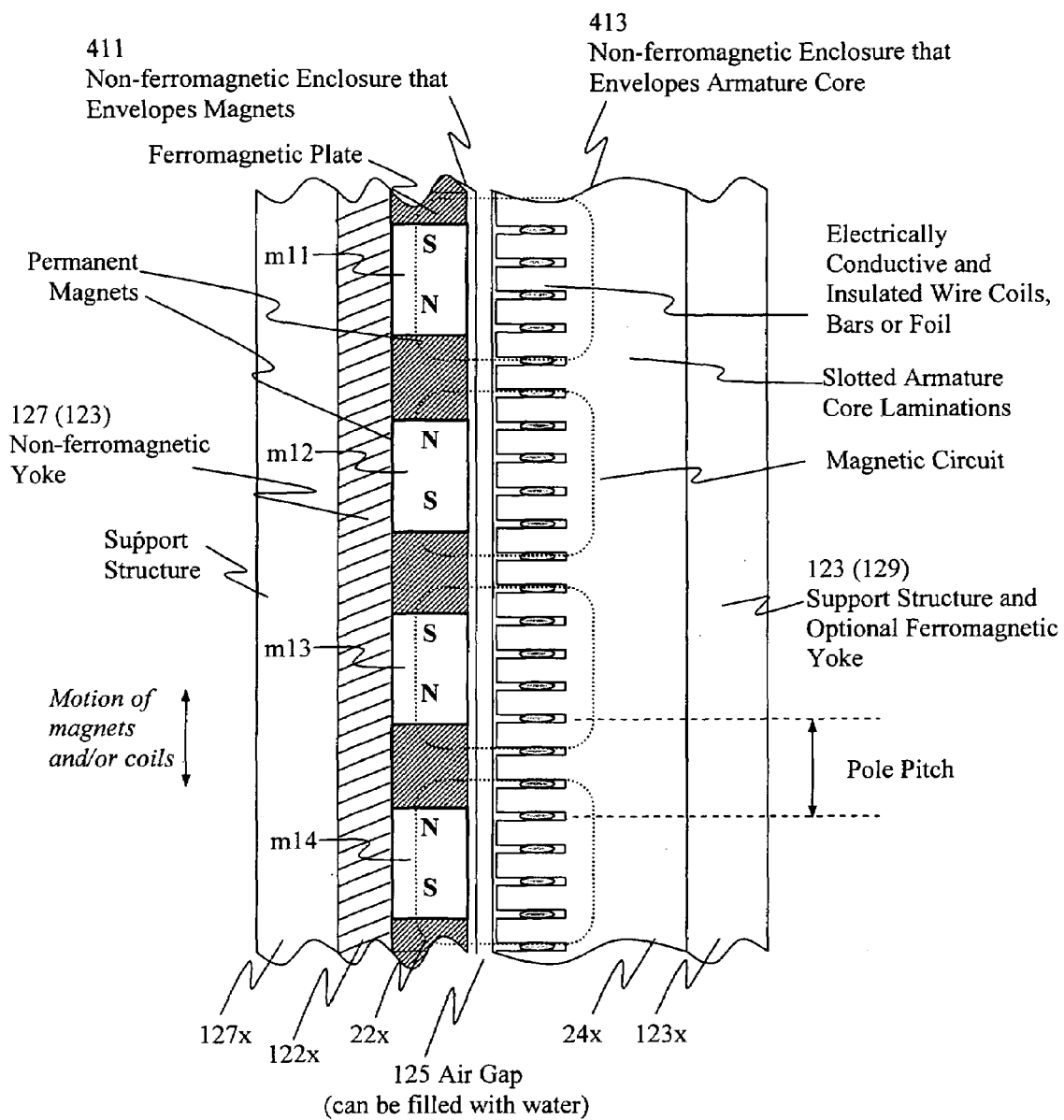
FIG. 4B is illustrative of a LEG with a "buried" permanent magnet assembly configuration using electrically conductive wires, coils, bars, or foils, for practicing the invention.

FIGS. 4A and 4B are cross-sectional diagrams showing the formation of two different permanent magnet assembly and coil assembly configurations. FIG. 4A shows a structure which may be termed a "surface" permanent magnet configuration. In the structure of FIG. 4A, the permanent magnets 22s are mounted on a ferromagnetic plate 122s which is mounted on a magnetic support structure 127s. The magnetic assembly may be enclosed in a non-ferromagnetic enclosure 411. The magnets (mia, mib) of the magnetic assembly are affixed to the surface of the "magnetic" plate with the magnets magnetized in a direction perpendicular to the direction of relative motion between the induction coils and the magnets (mia, mib). Each magnet (mia—north-south pole) has a polarity opposite to that of its neighboring magnet (mib—south-north pole).

It is possible to configure each magnet pole out of multiple magnets (i.e. one magnet pole can actually be several side-by-side magnets magnetized with same polarity). The longitudinal distance between the centers of adjacent magnets (of opposite polarity) is the "pole pitch." The magnets are oppositely polarized and the number of magnets per assembly is a multiple of two. The induction coil assembly 24s includes a slotted armature of ferromagnetic material which functions as a yoke mounted on a coil support structure 123s. The induction coil assembly is enclosed in a non-ferromagnetic enclosure 413. As shown in FIG. 4A, numerous slots are formed in the yoke, on the side facing the permanent magnet assembly 22, and conductive coils (electrically conductive and insulated wire coils, or bars, or foil) are inserted in these slots. A magnetic "circuit" is comprised of a north polarized magnet, an air gap between the north polarized magnet and the induction coil assemblies, the coils and yoke assembly, the air gap between a south polarized magnet and coil assemblies, the south polarized magnet, and the ferro-magnetic magnet backing plate. Mechanical force and motion are converted to electrical current and voltage by means of this electromagnetic conversion.

The slots are perpendicular to the direction of relative motion between the magnet and coil assemblies. Each coil is formed of electrically conductive material (e.g., copper wire) that enters a slot on one side of the yoke, exits the slot on the other side, travels towards another slot located a distance of one magnetic pole pitch in the longitudinal direction and exits the same slot on the other side of the yoke. The number of slots and coils may be any multiple of two per magnet assembly pole pitch.

For example, a three-phase implementation would have three coils placed in six slots covering a longitudinal distance equal to that of the magnet pole pitch. This pattern of coils can be repeated over the length of the coil assembly and the coils can be connected in series, electrically, to increase the voltage output.

The motion of the coils relative to the magnets causes a voltage to be induced in the coils that is proportional to the magnitude and rate of change of magnetic flux. Electric current flows through the coils when an external load is connected across the terminals of the coils.

FIG. 4B shows a magnet support plate 127x on which is mounted a non-ferromagnetic yoke 122x on which is mounted a ferromagnetic plate which includes permanent magnets contained within the ferromagnetic plate. In FIG. 4B, two north poles were placed next to (and opposite) each other and two south poles next to each other. This structure is generally referred to as a "buried" permanent magnet configuration. Each one of the magnetic and coil assemblies are separately enclosed in non-ferromagnetic enclosures as shown in FIG. 4A. The "surface magnet" configuration of FIG. 4A as well as the "buried magnet" configuration of FIG. 4B are viable options for implementing the invention.

Figure 5A:
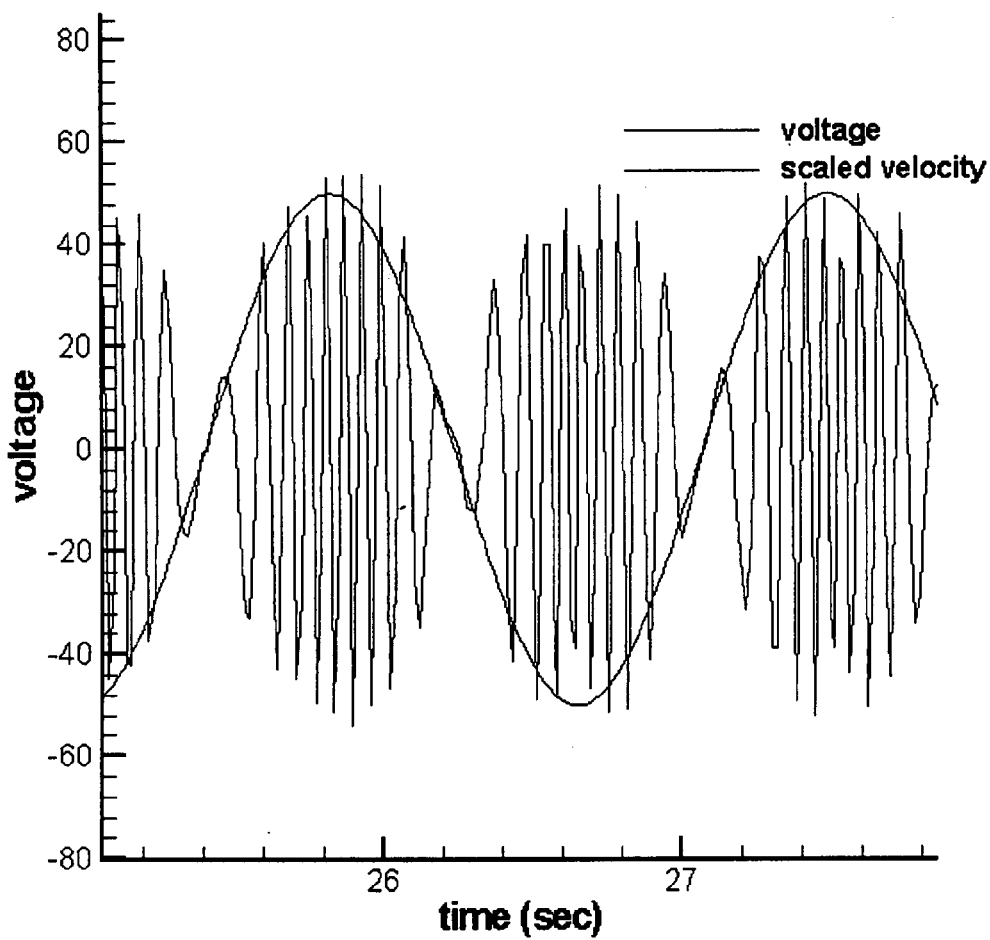
FIGS. 5a and 5b are waveform diagrams illustrating improved voltage and power generated with LEGs installed in WECs, in accordance with the invention.

FIG. 5a shows the LEG output voltage as a function of the WEC shell-to-column differential speed (i.e., the speed of the shell relative to the column). As shown, LEG output voltage amplitude is proportional to speed. LEG output voltage is also proportional to magnetic flux and coil configuration. LEG output voltage frequency is shown also to be proportional to speed. This may be explained as follows. Each time a coil passes over a pole pair (north-south magnets) a voltage cycle is produced. If the coil passes over the pole pair in less time (due to increased velocity), the frequency of the output voltage is increased.

Figure 5B:
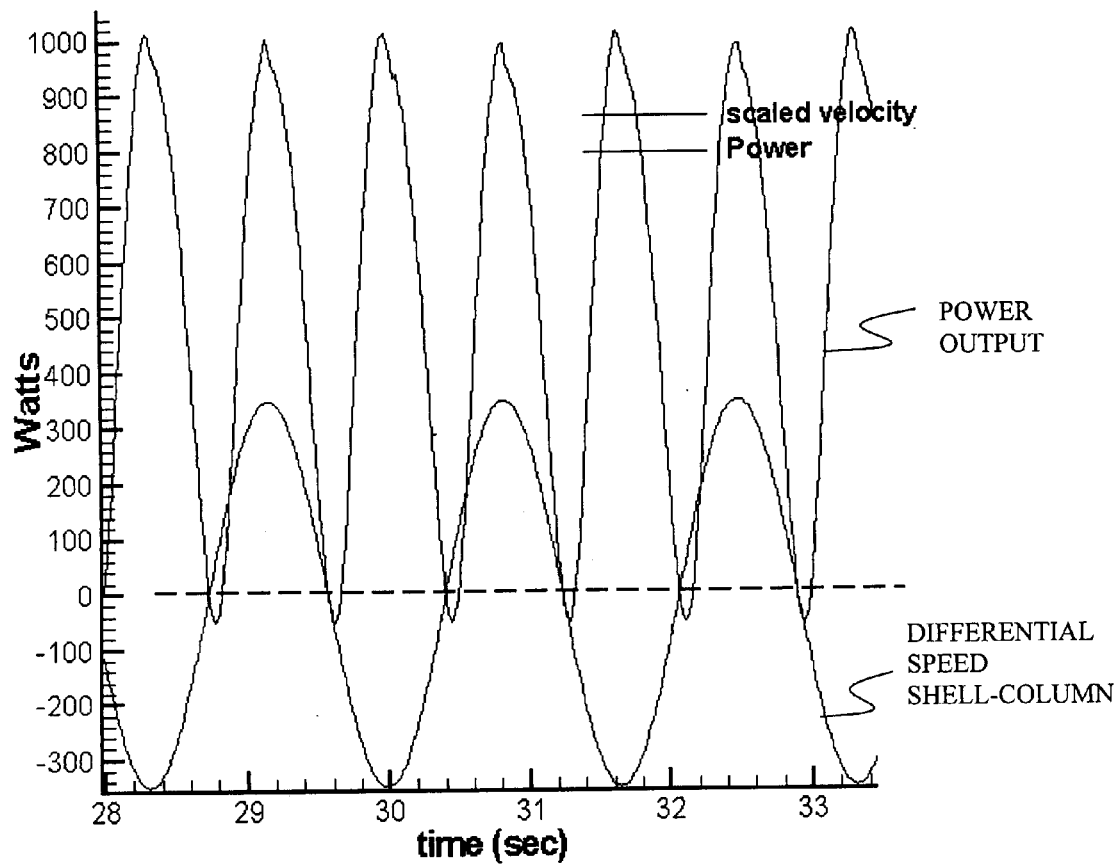

FIG. 5b shows LEG output power as a function of WEC shell to column differential speed. In the example shown, LEG power is maximum when the shell to column speed is greatest. The average power of the WEC is approximately one half the peak power.

It should be appreciated that:

1. As the speed of the PMA or ICA is increased by the lever arm ratio [vleg=vfloat*(a+b)/a], the effective force goes down by the lever arm ratio [power (speed times force) remains the same]. For a 1:1 lever, the relative speed doubles while the effective force is cut in half.

2. But, the required size of the magnet assembly which is roughly proportional to the force (typically 20-25 kN per square meter) may be cut in half, if the force is cut in half. The net result is that the size of the PMA can be reduced significantly (e.g., from 6 square meters to 3 square meters).

3. Reducing the size one component, (i.e., the PMA) by the lever ratio, generally entails that the size (i.e., length) of the other component (e.g. the ICA functioning as the stator) needs to go up by the lever arm ratio. For a 1:1 lever, the stator length doubles while the magnet assembly length halves. Given that the magnet and coil assemblies have some non-zero length, the ratio is not quite proportional to the lever arm ratio.

Benefits of incorporating these features include:
1. Voltage produced at the output of the ICA is proportional to speed for a fixed pole pitch of the PMA. Minimum pole pitch is generally fixed by the width of the air gap that can be maintained. The pole pitch should be at least 25 times the air gap width. Efficiency generally increases with voltage. Therefore, higher speed and voltage generally translates to higher efficiency. Higher voltage is good because current decreases and $I^2R$ losses go down. Also, higher voltage is good because power converter switching devices often have fixed voltage drop (e.g. 1.8V for IGBT transistors).
2. Frequency is proportional to speed for a fixed pole pitch. Minimum pole pitch is generally fixed by the width of the air gap that can be maintained. A passive rectifier system (comprised of a set of diodes and capacitors) generally performs better and/or is smaller for a higher electrical frequency. If voltage ripple is a concern, the higher frequency help reduce the size of the capacitors or the amount of voltage ripple.
3. The permanent magnet assembly is typically the heavier and more expensive piece of the LEG system. Therefore, reducing its size at the expense of increasing the size of the stator generally helps system mass and cost.
4. Shrinking the magnet assembly size has several benefits
   a. Easier to protect from debris pick-up
   b. Easier to protect personnel
   c. Less PMA-ICA attractive force, which simplifies bearing design; (this is important since, for example, a small 1 KW LEG had 4 tons of attractive force.)

It should also be appreciated that the lever arm and LEG can be contained completely within the inner portion of the shell and the inner portion of the shell can be sealed. Elements 910, 911 would be seals which would keep the internal compartment of the shell sealed. In this manner the LEG can be in an air tight compartment. A push rod from outside the shell would enter the inner portion of the shell through the seal to activate the lever arm and drive the PMA and/or the ICA.

What is claimed is:

1. A wave energy converter (WEC) comprising:
   a shell and a column intended to be placed in a body of water with the shell and column moving relative to each other as a function of the waves present in the body of water; with the shell moving generally in phase with the waves;
   a lever arm having an input end, an output end, and an intermediate point between the input and output ends;
   means for rotatably connecting the intermediate point of the lever arm to the column and for connecting the input end of the lever to the shell, whereby the input end of the lever moves at a rate determined by the shell and in phase with the shell which moves generally in phase with the waves, and whereby the output end moves at a rate which is a multiple of the rate of the shell and in direction which is generally opposite that of the shell.

2. A WEC as claimed in claim 1 wherein the lever arm is rotatably mounted along the column below the shell.

3. A WEC as claimed in claim 1 wherein the lever arm is rotatably mounted along the column above the shell.

4. A WEC as claimed in claim 1 wherein the portion of the lever extending from the intermediate point to the input end has a length "a" and wherein the portion of the lever arm extending between the intermediate point and the output end has a length "b"; and wherein the speed at the output end of the lever arm is equal to the speed of the input end multiplied by b/a.

5. A WEC as claimed in claim 4 wherein one of an induction coil assembly (ICA) and a permanent magnetic assembly (PMA) is attached to the shell, and moves in concert with the shell, and the other one of the ICA and PMA is coupled to, and driven from, the output end of the lever arm and moves across the one of the ICA and PMA attached to the shell at a speed which is substantially equal to the speed of the input end multiplied by b/a; and wherein the differential speed between the PMA and the ICA is equal to the sum of the speeds at the input end and the output end.

6. A WEC as claimed in claim 1 wherein one of an induction coil assembly (ICA) and a permanent magnetic assembly (PMA) is attached to the inside wall of the shell, and moves in concert with the shell, and the other one of the ICA and PMA is coupled to, and driven from, the output end of the lever arm and moves across the one of the ICA and PMA attached to the shell at a speed which is substantially equal to the speed of the input end multiplied by b/a; and wherein the differential speed between the PMA and the ICA is equal to the sum of the input end and the output end.

7. A WEC as claimed in claim 1 wherein one of an induction coil assembly (ICA) and a permanent magnetic assembly (PMA) is attached to the outside wall of the shell, and moves in concert with the shell, and the other one of the ICA and PMA is coupled to, and driven from, the output end of the lever arm and moves across the one of the ICA and PMA attached to the shell at a speed which is substantially equal to the speed of the input end multiplied by b/a; and wherein the differential speed between the PMA and the ICA is equal to the sum of the input end and the output end.

8. A WEC as claimed in claim 1 wherein one of an induction coil assembly (ICA) and a permanent magnetic assembly (PMA) is attached to the column, and the other one of the ICA and PMA is coupled to, and driven from, the output end of the lever arm and moves across the one of the ICA and PMA attached to the shell at a speed which is substantially equal to the speed at the output end of the lever.

9. A wave energy converter (WEC) comprising:
   a shell and a column intended to be placed in a body of water with the shell and column moving relative to each other as a function of the waves present in the body of water;
   a mechanical translator coupled between the shell and the column having an input responsive to the input speed (v1) of the shell relative to the column and having an output whose speed (v2) is a multiple of the input speed (v1) of the shell relative to the column; and
   one of an induction coil assembly (ICA) and a permanent magnetic assembly (PMA) is attached to the shell, and moves in concert with the shell, and the other one of the ICA and PMA is driven from the output of the mechanical translator and moves across the one of the ICA and PMA attached to the shell.

* * * * *